(12) United States Patent
Beachy

(10) Patent No.: US 10,113,599 B2
(45) Date of Patent: Oct. 30, 2018

(54) RETAINING BRACKET FOR DISC BRAKE CALIPER AND KIT INCLUDING THE SAME

(71) Applicant: Edwin Beachy, Campbell Hill, IL (US)

(72) Inventor: Edwin Beachy, Campbell Hill, IL (US)

(*) Notice: Subject to any disclaimer, the term of this patent is extended or adjusted under 35 U.S.C. 154(b) by 0 days.

(21) Appl. No.: 15/426,977

(22) Filed: Feb. 7, 2017

(65) Prior Publication Data

US 2018/0223926 A1  Aug. 9, 2018

(51) Int. Cl.
*F16D 65/38* (2006.01)
*F16D 65/00* (2006.01)
*F16D 65/092* (2006.01)
*F16D 55/225* (2006.01)

(52) U.S. Cl.
CPC ......... *F16D 65/092* (2013.01); *F16D 55/225* (2013.01); *F16D 65/0056* (2013.01); *F16D 65/0075* (2013.01)

(58) Field of Classification Search
CPC ............... F16D 65/092; F16D 65/0056; F16D 65/0075; F16D 55/225
See application file for complete search history.

(56) References Cited

U.S. PATENT DOCUMENTS

| | | | | |
|---|---|---|---|---|
| 5,947,234 A * | 9/1999 | Shimazaki | ............ | F16D 55/228 188/73.36 |
| 6,302,243 B1 * | 10/2001 | Ruiz | ..................... | F16D 55/228 188/73.1 |
| 8,037,977 B2 * | 10/2011 | Arakawa | ............. | F16D 65/0977 188/250 E |
| 8,371,422 B2 | 2/2013 | Frost et al. | | |
| 8,556,045 B2 | 10/2013 | Schmandt et al. | | |
| 8,627,929 B2 | 1/2014 | Baumgartner et al. | | |
| 2002/0038742 A1 * | 4/2002 | Bunker | ................... | B60T 1/065 188/73.38 |
| 2003/0042085 A1 * | 3/2003 | Kang | .................. | F16D 65/0012 188/73.38 |
| 2004/0262099 A1 * | 12/2004 | Crippa | .................... | F16D 55/22 188/73.35 |
| 2010/0038190 A1 | 2/2010 | Renz et al. | | |
| 2013/0256068 A1 | 10/2013 | Hazeki et al. | | |
| 2014/0158482 A1 | 6/2014 | Philpott | | |
| 2015/0226275 A1 | 8/2015 | Atsuta et al. | | |
| 2016/0091038 A1 | 3/2016 | Asahi et al. | | |
| 2016/0131211 A1 | 5/2016 | Brandl et al. | | |

FOREIGN PATENT DOCUMENTS

| | | |
|---|---|---|
| JP | 2005-249134 A | 9/2005 |
| WO | WO 2014/079869 A1 | 5/2014 |
| WO | 2015155708 A1 | 10/2015 |

* cited by examiner

*Primary Examiner* — Melody M Burch
(74) *Attorney, Agent, or Firm* — Richard C. Litman

(57) ABSTRACT

A kit including first and second retaining brackets for hydraulic disc brake systems is provided. The first retaining bracket is adapted for circumferential fixation about a conventional caliper associated with hydraulic disc brakes. The second retaining bracket is adapted for positioning against an underside of the caliper and for fixation to a conventional mounting bracket for the caliper. The first and second retaining brackets provide additional reinforcement for the brake pads of the hydraulic disc brake system, preventing them from becoming dislodged or misaligned.

3 Claims, 4 Drawing Sheets

RETAINING BRACKET FOR DISC BRAKE CALIPER AND KIT INCLUDING THE SAME

BACKGROUND OF THE INVENTION

1. Field of the Invention

The present invention relates to hydraulic disc brake systems, and particularly to retaining brackets for providing additional securement for the brake pads of the hydraulic disc brakes.

2. Description of the Related Art

A disc brake is a type of brake that uses calipers to squeeze pairs of pads against a disc in order to create friction that retards the rotation of a shaft, such as a vehicle axle, either to reduce its rotational speed or to hold it stationary. The brake caliper is the assembly which houses the brake pads and pistons. A typical brake caliper has two brake pads associated therewith, with the brake pads typically being held to the caliper by pad retention pins. Due to excessive shock, wear and tear, etc., pad retention pins can fail, thus resulting in the brake pads becoming misaligned with respect to the caliper or becoming fully dislodged therefrom. Thus, a retaining bracket for a disc brake caliper and kit including the same solving the aforementioned problems is desired.

SUMMARY OF THE INVENTION

The retaining bracket for a disc brake caliper is a bracket adapted for circumferential fixation about a caliper associated with hydraulic disc brakes. The retaining bracket provides additional securement for the brake pads of the hydraulic disc brake system, preventing them from becoming dislodged or misaligned. The retaining bracket includes a pair of substantially arcuate, parallel rods with a pair of crossbeams extending therebetween and secured thereto. A plurality of extending members are each secured to, and extend from, a respective one of a pair of opposed ends of each of the substantially arcuate, parallel rods. Each extending member has an aperture formed therethrough such that each end of each of the substantially arcuate, parallel rods can be fixed circumferentially about the caliper to provide a reinforced caliper.

The retaining bracket described above may be a first retaining bracket of a pair of retaining brackets provided as a kit. A second retaining bracket in the kit includes a substantially trapezoidal plate having opposed first and second ends, with a recess being formed in the first end for receiving an axle of the rotor about which the hydraulic disc brakes are mounted. A flange is secured to the second end of the substantially trapezoidal plate and extends substantially orthogonal thereto. The flange is adapted for positioning against an underside of the disc brake caliper. A pair of openings are formed through the first end of the substantially trapezoidal plate for receiving a pair of threaded bolts for interconnection with a conventional mounting bracket for the caliper.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
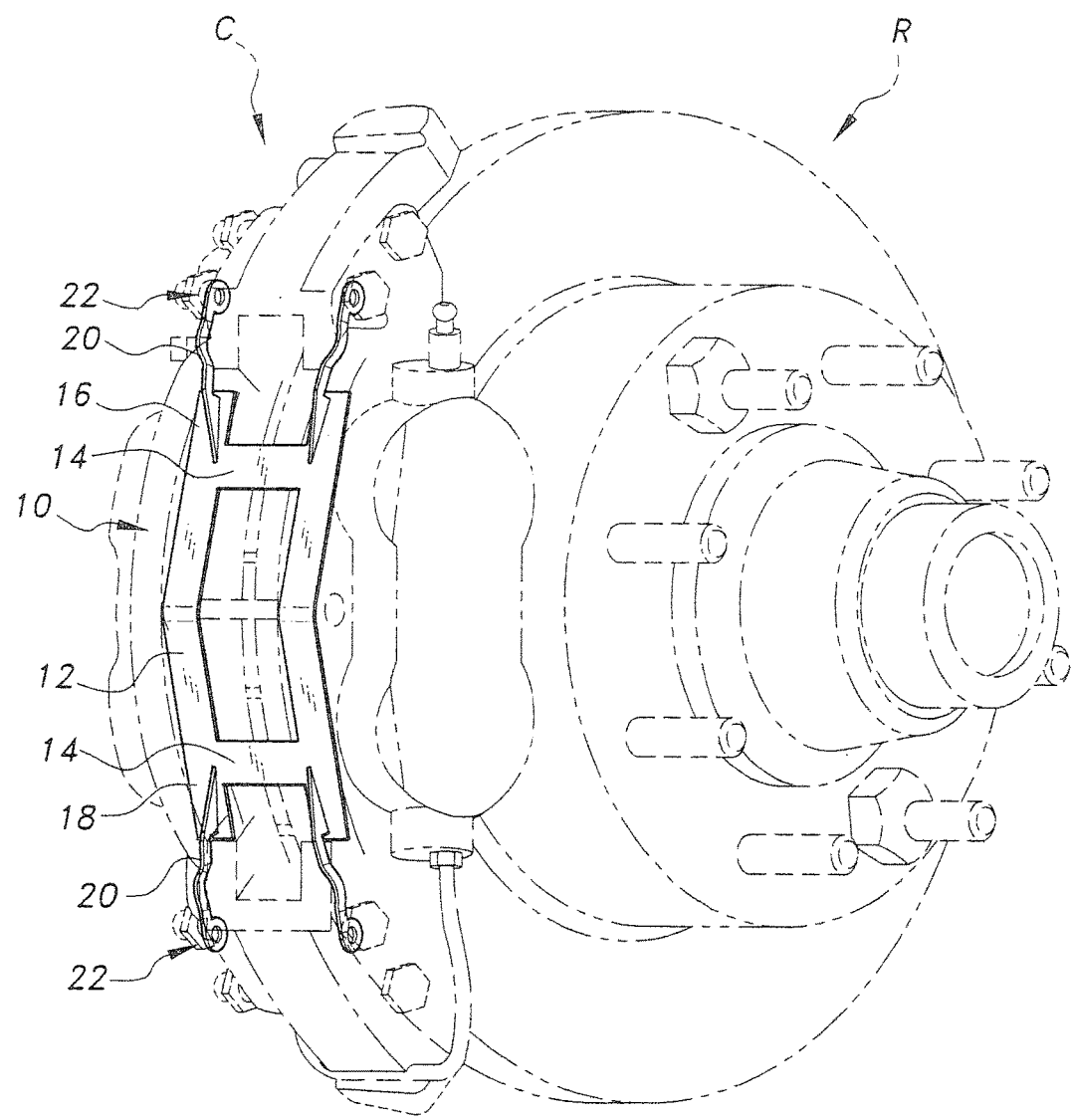
FIG. 1 is an environmental, perspective view of a retaining bracket for a disc brake caliper according to the present invention.

As shown in FIG. 1, the retaining bracket for a disc brake caliper 10 is a bracket adapted for connecting to a caliper C associated with hydraulic disc brakes. The retaining bracket 10 provides additional security for the brake pads BP (shown in FIG. 2) of the hydraulic disc brake system, preventing them from becoming dislodged or misaligned. As shown, the retaining bracket 10 includes a pair of parallel rods 12 with a pair of crossbeams 14 extending therebetween and secured thereto. The rods 12 can be substantially arcuate or angled. For example, each rod 12 can have a single bend at or about halfway between the crossbeams 14. Each rod 12 has a pair of opposed ends 16, 18. An extending member 20 is secured to, and extends from, each of the opposed ends of each of the substantially arcuate, parallel rods 12, as shown. Each extending member 20 has an aperture 22 formed therethrough.

Figure 2:
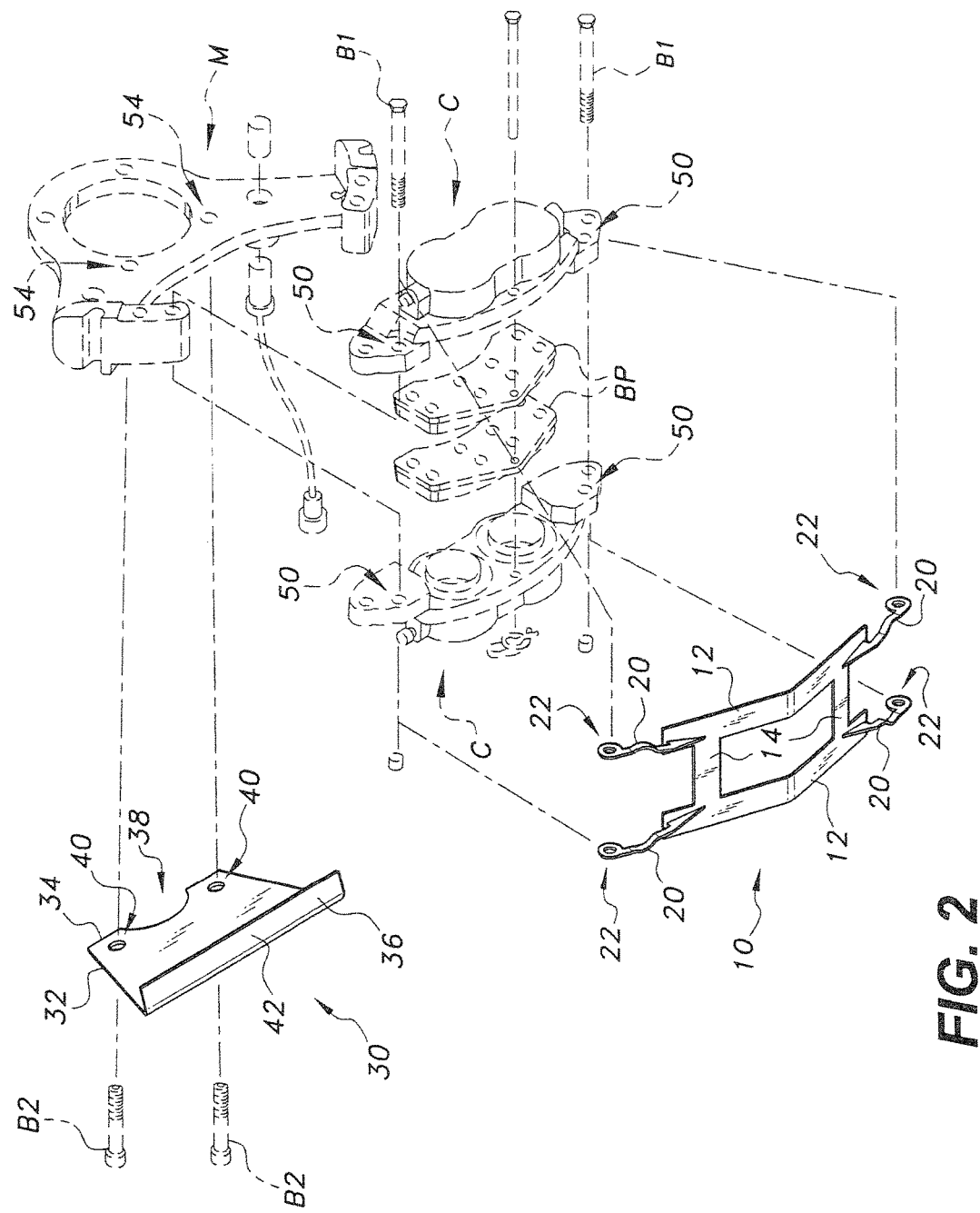
FIG. 2 is an exploded, environmental perspective view of a kit of retaining brackets for disc brakes including the retaining bracket for a disc brake caliper of FIG. 1.

Referring to FIG. 2, each end of each of the substantially arcuate, parallel rods 12 can be fixed to a circumferential portion the caliper C, preferably using the mounting bolts B1 which are typically provided with a conventional caliper C. As is conventionally known, the caliper C can be mounted on a mounting bracket M which, itself, is mounted about an axle of a rotor, such as exemplary rotor R shown in FIG. 1. Caliper C can be secured to mounting bracket M by bolts B1 or the like, and apertures 22 are adapted for also receiving bolts B1, allowing the retaining bracket 10 to be secured about caliper C by interconnection with bolts B1.

It should be understood that the lengths and degrees of contouring of the substantially arcuate, parallel rods 12, as well as the lengths of crossbeams 14, may be varied to properly mate with a variety of different types and models of calipers. It should be understood that caliper C is shown for exemplary purposes only and that the retaining bracket 10 may be manufactured with a variety of overall sizes, contourings and relative dimensions to provide proper matches for a variety of different calipers. Additionally, although caliper C is shown as having bolts B1, it should be understood that some calipers may have no such bolts, or may have bolts located in a different location, thus it should be further understood that any suitable type of fixture may be used to secure retaining bracket 10 to the particular caliper in use. It should be further understood that retaining bracket 10 may be manufactured from any suitable type of material, such as corrosion-resistant metal, which is strong enough to securely hold the brake pads BP in place with respect to the caliper.

Figure 3:
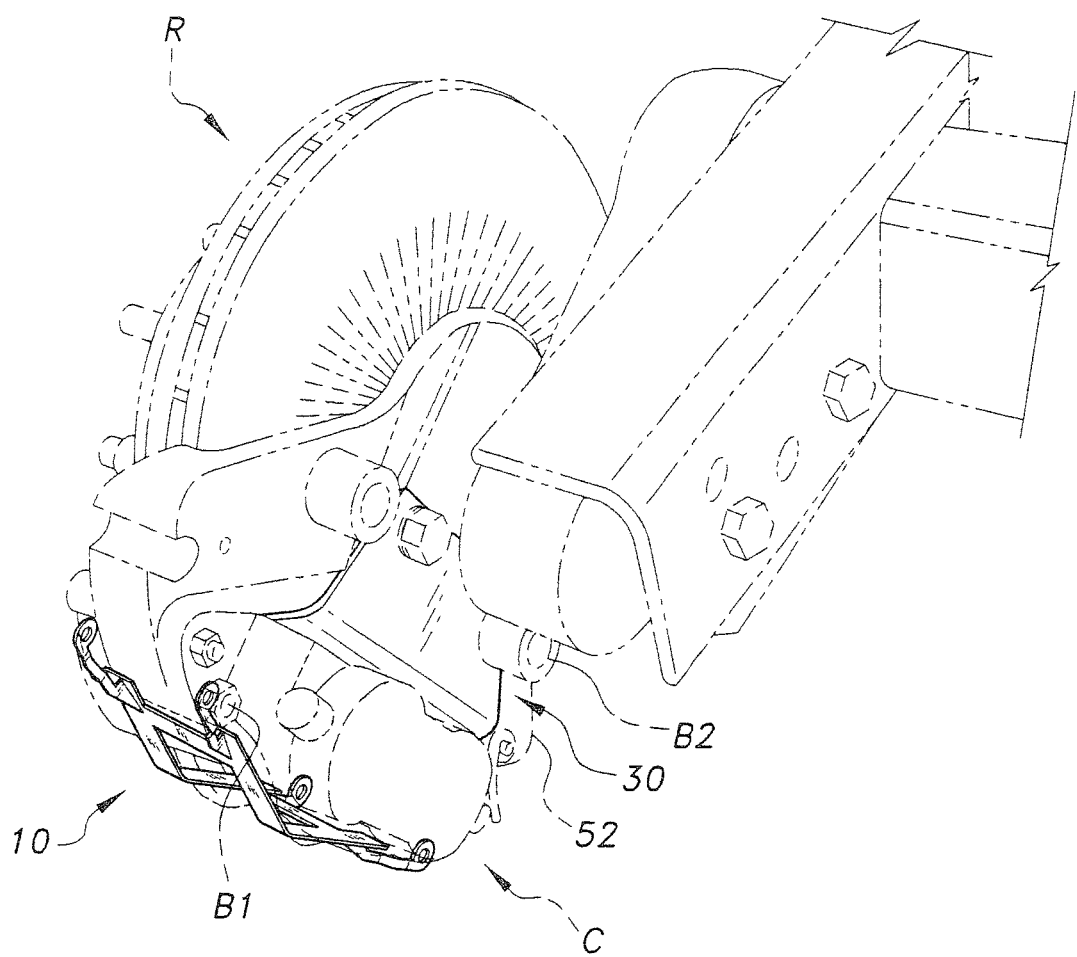
FIG. 3 is an environmental perspective view of the kit of retaining brackets for disc brakes according to the present invention.
Figure 4:
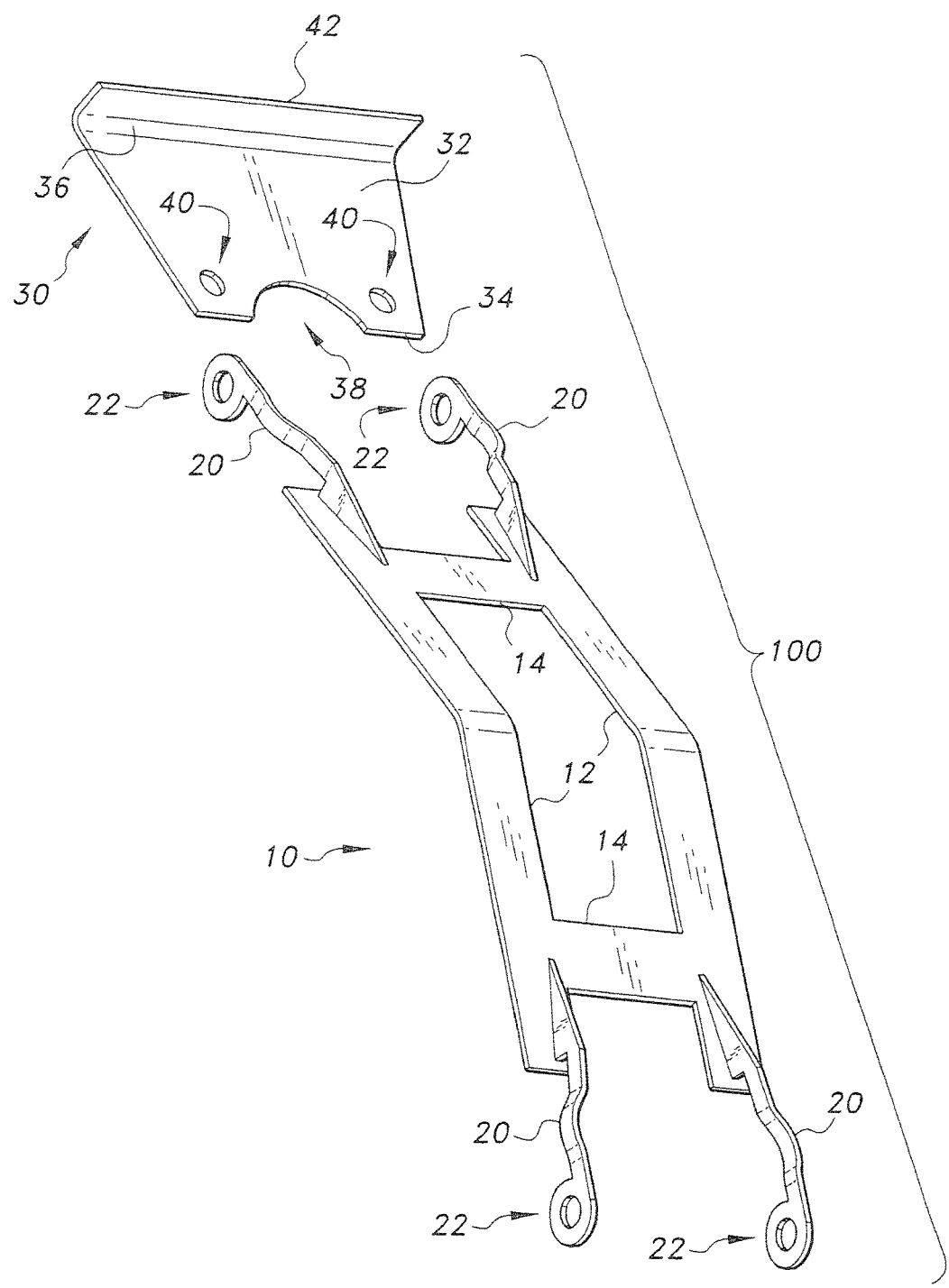
FIG. 4 is a perspective view of the kit of retaining brackets for disc brakes according to the present invention.

As shown in FIG. 4, the retaining bracket 10 described above may be a first retaining bracket of a pair of retaining brackets provided as a kit 100. As shown in FIGS. 3 and 4, a second retaining bracket 30 in the kit 100 includes a substantially trapezoidal plate 32 having opposed first and second ends 34, 36, respectively. A recess 38 is formed in the first end 34 for receiving the axle of the rotor R about which the hydraulic disc brakes are mounted. A flange 42 is secured to the second end 36 of the substantially trapezoidal plate 32 and extends substantially orthogonal thereto, as shown. As best seen in FIG. 3, the flange 42 is adapted for positioning against an underside 52 of the disc brake caliper C.

As best shown in FIG. 2, a pair of openings 40 are formed through the first end 34 of the substantially trapezoidal plate 32 for receiving a pair of threaded bolts B2 for interconnection with the conventional mounting bracket M for the caliper C. As shown, a pair of openings 54 are preferably formed through the mounting bracket M, and the threaded bolts B2 pass through openings 40 and openings 54 to secure the plate 32 to the mounting bracket M.

It should be understood that the overall size, shape and relative dimensions of second retaining bracket 30 may be varied to properly mate with a variety of different types and models of calipers and mounting brackets. It should be understood that mounting bracket M is shown for exemplary purposes only and that the second retaining bracket 30 may not only be manufactured with a variety of overall sizes, contourings and relative dimensions to provide proper matches for a variety of different calipers and mounting brackets, but that any suitable type of fixture may be used to secure the second retaining bracket 30 to the mounting bracket. Although mounting bracket M is shown as having a pair of openings 54 for receiving bolts B2, it should be understood that some mounting brackets may have no such openings, or may have openings located in different locations, thus any suitable type of fixture may be used to secure retaining bracket 30 to the particular mounting bracket in use. It should be further understood that second retaining bracket 30 may be manufactured from any suitable type of material, such as corrosion-resistant metal, which is strong enough to securely hold the brake pads BP in place with respect to the caliper and the mounting bracket.

It is to be understood that the present invention is not limited to the embodiments described above, but encompasses any and all embodiments within the scope of the following claims.

I claim:

1. A kit of retaining brackets for disc brakes, comprising:
    a first retaining bracket comprising:
        a pair of substantially arcuate, parallel rods;
        a pair of crossbeams extending between, and secured to, said pair of substantially arcuate, parallel rods; and
        extending members extending from opposing ends of each of said parallel rods, the extending members adapted for securing said pair of substantially arcuate, parallel rods to a disc brake caliper; and
    a second retaining bracket comprising:
        a substantially trapezoidal plate having opposed first and second ends, a recess being formed in the first end adapted for receiving a rotor axle;
        a flange secured to the second end of the substantially trapezoidal plate and extending substantially orthogonal thereto, the flange being adapted for positioning against an underside of the disc brake caliper; and
        a pair of openings formed through the first end of the substantially trapezoidal plate for receiving a pair of threaded bolts for interconnection with the disc brake caliper.

2. The kit of retaining brackets for disc brakes as recited in claim 1, wherein each extending member has an aperture formed therethrough for receiving a fastener.

3. A reinforced disc brake caliper, comprising:
    a disc brake caliper; and
    a first retaining bracket affixed to a circumferential portion of the disc brake caliper, the first retaining bracket including:
        a pair of substantially arcuate, parallel rods;
        a pair of crossbeams extending between, and secured to, said pair of substantially arcuate, parallel rods;
        extending members extending from opposing ends of each of said parallel rods, the extending members adapted for securing said pair of substantially arcuate, parallel rods to the disc brake caliper; and
    a second retaining bracket, the second retaining bracket including a substantially trapezoidal plate having opposed first and second ends, a recess being formed in the first end, and a flange secured to the second end of the substantially trapezoidal plate and extending substantially orthogonal thereto, the flange being positioned against an underside of the disc brake caliper.

* * * * *